United States Patent
Iyer et al.

(10) Patent No.: US 7,269,173 B2
(45) Date of Patent: Sep. 11, 2007

(54) ROAMING IN A COMMUNICATIONS NETWORK

(75) Inventors: N. Prakash Iyer, Beaverton, OR (US); Farid Adrangi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 10/186,322

(22) Filed: Jun. 26, 2002

(65) Prior Publication Data

US 2004/0203749 A1 Oct. 14, 2004

(51) Int. Cl.
*H04L 12/40* (2006.01)

(52) U.S. Cl. .............. 370/395.31; 455/432.1

(58) Field of Classification Search ......... 455/435.1, 455/436, 439, 442, 452.1, 453, 456.2, 428, 455/404.2, 418, 432.1, 445; 370/395.52, 370/331, 401, 354, 313, 338, 426, 352, 328, 370/392, 397, 399, 395.31, 395.3

See application file for complete search history.

(56) References Cited

U.S. PATENT DOCUMENTS

| | | | |
|---|---|---|---|
| 6,510,153 B1 * | 1/2003 | Inoue et al. ................. | 370/354 |
| 6,567,664 B1 * | 5/2003 | Bergenwall et al. ...... | 455/435.1 |
| 2002/0080752 A1 * | 6/2002 | Johansson et al. .......... | 370/338 |
| 2002/0114323 A1 * | 8/2002 | Chowdhury et al. ........ | 370/352 |
| 2003/0123421 A1 * | 7/2003 | Feige et al. ................. | 370/338 |
| 2003/0224788 A1 * | 12/2003 | Leung et al. ............ | 455/435.1 |

* cited by examiner

*Primary Examiner*—Edward F. Urban
*Assistant Examiner*—Tu Nguyen
(74) *Attorney, Agent, or Firm*—Fish & Richardson P.C.

(57) ABSTRACT

Communicating over a network may include a mobile proxy device to receive a request for a home agent from a mobile device. The mobile proxy device can assign a home agent to the mobile device and send a reply including a home-address associated with the assigned home agent to the mobile device.

32 Claims, 5 Drawing Sheets

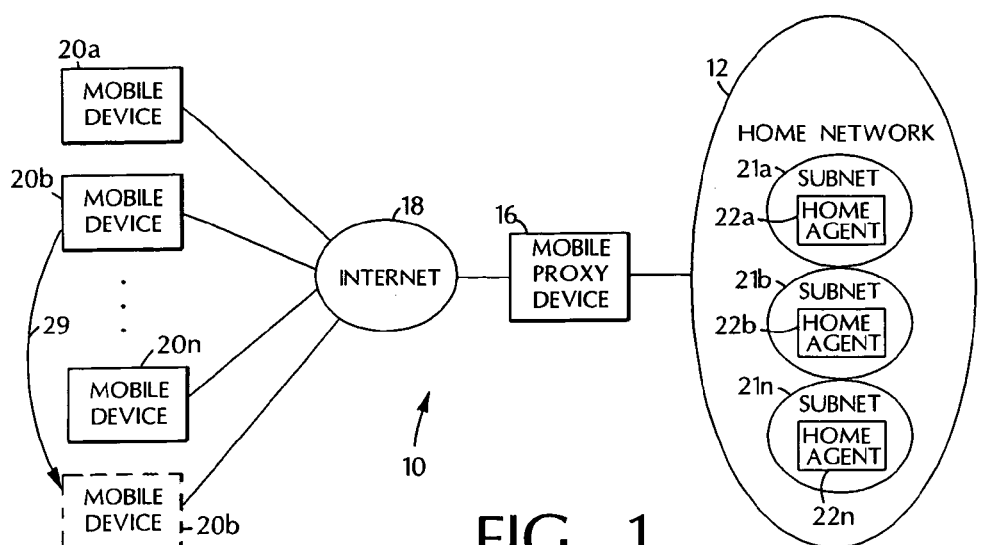
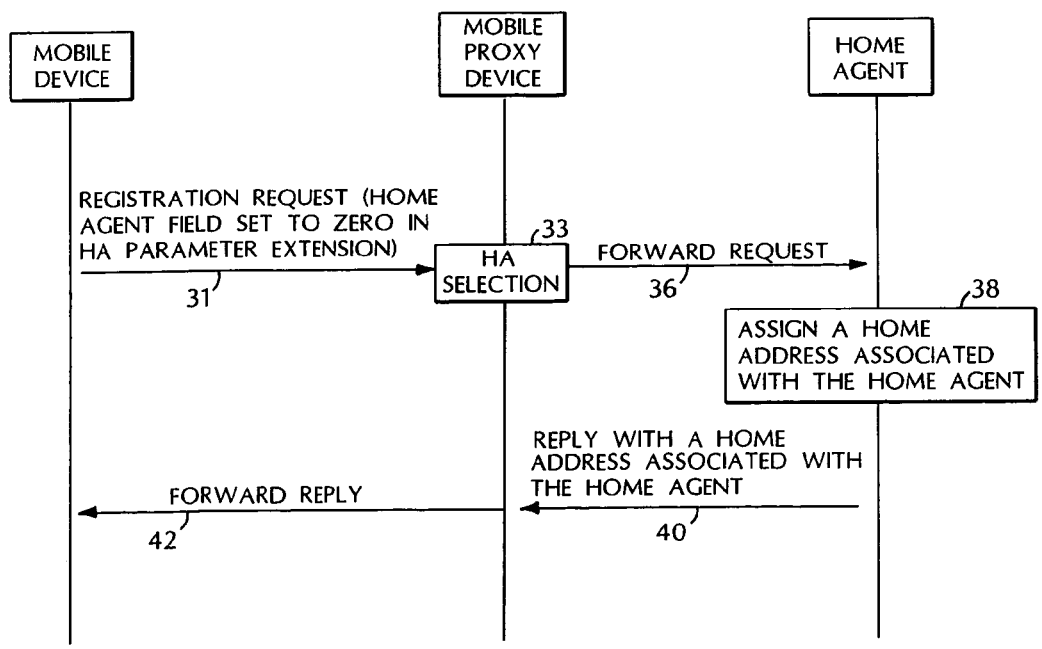
FIG. 1
FIG. 3

ROAMING IN A COMMUNICATIONS NETWORK

BACKGROUND

This disclosure relates to roaming in a communications network.

Mobile Internet protocol ("Mobile IP") is a communications protocol that defines how mobile devices such as mobile computers maintain transport session continuity and constant reachability over IP-based wireless or wired networks. Mobile IP is specified in a request for comments (RFC) 3220 dated January 2002 as set out by the Mobile IP working group in the Internet engineering task force (IETF).

Mobile IP is based on the notion of a home subnet in which each mobile device may be assigned a "fixed" home-address. The home-address is an invariant IP address that makes it appear that the mobile device is always attached to the home network, independent of its current physical location. If the mobile device roams from the home subnet to a foreign network, it acquires a care-of-address which is notified to the mobile device's home agent through a registration request. This enables the home agent to forward packets destined to the mobile device to the specified care-of address.

BRIEF DESCRIPTION OF THE DRAWINGS

FIG. 1 illustrates a wireless communications network.

FIG. 3 is a flow diagram of processing requests from a mobile device.

DETAILED DESCRIPTION

Figure 2:
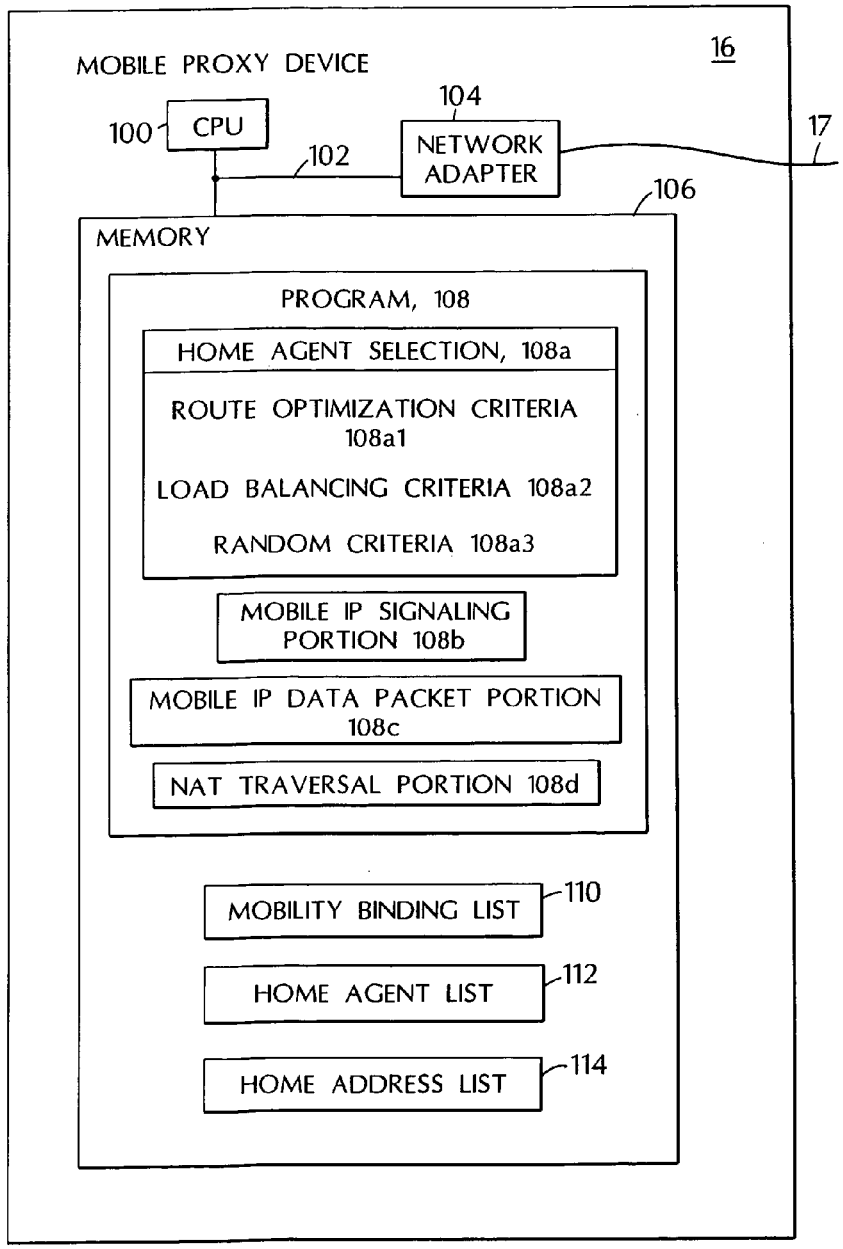
FIG. 2 is a block diagram of a mobile proxy device.

Referring to FIG. 1, a wireless communications network 10 includes mobile devices (20a, 20b, 20n), a mobile IP proxy device 16, a home network 12 based on Mobile IP infrastructure which defines how a mobile device, such as mobile device 20b, communicates and maintains connectivity with the home network 12 including when the mobile device 20b roams across the home network. The wireless communications network 10 (here also referred by a foreign network) may be based on a wireless standard that provides mobile devices with a wireless connection and a access to the Internet 18. The mobile device 20b in the wireless network 10 may register with its home agent (22a) in the home network 12 by generating registration requests directed to the Mobile IP Proxy. The mobile proxy device 16 processes the requests intended for the home agent (22a) to enable the mobile device 20b to maintain its transport connectivity while it is roaming outside its home network (12).

The home network 12 may include an IP-based network that includes subnets (21a, 21b, 21n) each of which is associated with one or more home agents (22a, 22b, 22n). For example, subnet 21a can be associated with home agent 22a and subnet 21b can be associated with home agent 22b. A subnet, such as subnet 21a, may be a separate part of the home network 12 and may represent the mobile device 20b in a particular geographic location, for example, in a building or on a local area network (LAN). The subnet 21a also can represent the mobile device 20b in different geographic locations such as corporate offices, residences, public areas such as airports, commercial establishments such as a hot spot communications connection point, or other locations.

The home agents (22a, 22b, 22n) may be network-compatible devices that maintain a mobility binding list of the mobile devices registered with a particular home agent. For example, once the mobile device 20b is registered with a home agent, such as home agent 22a, the home agent updates the mobility binding list with an identifier indicating the mobile device. The home agent 22a tracks the mobile device 20b and becomes responsible for routing datapackets destined to the mobile device 20 a to the care-of address of the mobile device in the foreign network using a tunneling process known as encapsulation. The tunneling process includes incorporating an original data unit (data packet or datagram) within another data unit so that fields within the original IP header temporarily lose their effect.

The mobile IP proxy device 16 may be a network device that receives from the mobile device 20b requests to register with one of the home agents (22a, 22b, 22n). The mobile IP proxy device 16 is an intermediate node that appears to the home network 12 as a surrogate mobile device when communicating with the home network. Similarly, the mobile IP proxy device 16 appears to the mobile device 20b as a surrogate home agent when communicating with the mobile device. The mobile proxy IP device 16 processes from the mobile device 20b a request to register with a home agent by dynamically assigning a home agent (22a, 22b, 22n) to the mobile device. Once a home agent has been assigned, the mobile IP proxy device 16 creates a new registration request and forwards it to the selected home agent for the mobile device 20b. The Mobile IP Proxy also creates a new reply and forwards it to the mobile device 20b, when it receives the reply that includes a home-address from the assigned home agent The mobile device 20b can now resume communicating over the Internet 18 through the home network 12. The operation of the mobile proxy device 16 is described in further detail below. The MIP Proxy will be deployed in environments where direct reachability between a mobile node and its corresponding home agent may not be possible due to intervening network elements such as VPN gateways or firewalls.

The mobile device 20b may include a host or a router device that may change its point of attachment from one network or subnet to another through the Internet 18. The mobile device 20b may include a device capable of handling Mobile IP communications such as a personal digital assistant (PDA), a handheld computer, a digital cellular phone or other device. The mobile device is capable of roaming process which is represented by an arrow 29 and by the mobile device 20b with a "dashed" box outline.

The Mobile IP protocol provides the mobile device 20b with two IP addresses: a home-address and a care-of-address. The home-address is an invariant IP address assigned to the mobile device 20b by a home agent in the network 12 that makes it appear to nodes in the Intranet 12 that the mobile device is attached to a permanent point of attachment. As a result, the device can continually receive data through the home network 12 over the Internet 18.

As is described in detail below, when the mobile device 20b wants to connect to the home network 12 from a foreign network, it acquires a care-of-address, which is an IP address that identifies the mobile device's point of attachment when it is not in the home network. In this case, the mobile device 20b registers the care-of-address with its assigned home agent through the mobile proxy device 16 so that the mobile device can maintain connectivity between the foreign network and the home network while it is roaming in the foreign network.

The wireless communications network 10 described above illustrates one particular embodiment. Other different configurations may include additional mobile proxy devices as well as mobile devices. Further, although reference was made to the mobile device 20b in the description above, the same remarks may also be applicable to the other mobile devices.

Referring to FIG. 2, the mobile IP proxy device 16 may include a central processing unit (CPU) 100, a memory 106, at least one network adapter 104 and a computer bus 102 coupling these components together. The CPU 100 processes data and executes instructions stored in the memory 106. An example of a CPU 100 includes an Intel® Pentium-brand processor and an example of a memory 106 includes dynamic random access memory (DRAM).

The memory 106 stores a program 108, a mobility binding list 110, a home agent list 112 and a home-address list 114. The program 108 includes a Mobile IP signaling portion 108b for processing/routing Mobile IP signaling (i.e., registration protocol) and a Mobile IP data packet portion 108c for processing IP data packets from/to the mobile device 20b. The mobile proxy device 16 processes the registration requests, and forwards them to the corresponding home agents. If a home agent is not specified in the registration request extension, the Mobile IP Proxy dynamically assigns a home agent (22a, 22b, 22n) to the mobile device 20b and forwards the registration request to the assigned home agent. The home agent list 112 includes a list of the home agents (22a, 22b, 22n), and the home-address list 114 includes a list of home-addresses. The mobile proxy device 16 selects a home agent from the home agent list 112 and a home-address from the home-address list 114 to satisfy the registration requests. The mobility binding list 110 is used to record mobility data for each registered mobile device, and it includes data such as mobile device's home address, care-of address, home agent, or other data.

The program 108 includes a home agent selection portion 108a which provides home agent selection procedures which may be based on route optimization criteria 108a1, load balancing criteria 108a2, random criteria 108a3 or other criteria. For example, route optimization criteria 108a1 may involve selecting an optimal home agent based on the current location of the mobile device 20b. Load balancing criteria 108a2 may be based on identifying and selecting a home agent that is lightly loaded compared to another home agent. On the other hand, a selection based on random criteria 108a3 may include a random process rather than a deterministic process.

The network adapter 104 may include a connection port 16 used by the mobile device 16 to communicate with the Internet 18 and the home network 12. There may be two network adapters, one per each connection (i.e., internet and home network). The network adapter 104 may include a combination of software and hardware components for handling the exchange of request and reply messages between the mobile proxy device 16 and a network. The network adapter 104 can be connected to networks that may include, for example, a wired LAN based on the IEEE 802.3 standard for Ethernet, a wireless LAN based on IEEE 802.11 a/b standard, or other networks. The network adapter 104 also can handle communications over a wireless wide area network (WAN) packet data networks based on 2.5 and third-generation technologies including code division multiple access (CDMA).

The mobile IP proxy device 16 can belong to the administrative domain associated with the home agents (22a, 22b, 22n) and the corresponding mobile device 20b. An administrative domain refers to an entity that specifies security parameters for Mobile IP registration. The mobile device 20b also can be configured to share security associations (SAs) for various registration extensions with its associated home agents. A security association refers to a collection of security contexts between a pair of mobile devices and may be applied to Mobile IP messages exchanged between the devices. Each context indicates an authentication algorithm and mode of a security.

The mobile IP proxy device 16 may be implemented as a standalone network device or incorporated in another network device such as router, gateway, switch or other network device. The functions performed by the mobile proxy device 16 may comply with the Mobile IP standard as defined in RFC 3220. For example, the mobile proxy device 16 may process registration requests and produce registration reply messages that adhere to the RFC 3220 standard.

Referring to FIGS. 1-4, a description of the operation of the mobile proxy device 16 in the home network 12 is provided below. In this particular example, an explanation is provided of how the mobile proxy device 16 may manage a mobile device, such as 20b, as it tries to connect to its home network (12) from a foreign network, and wants to maintain its transport connectivity to its home network while it is roaming outside the home network. It is assumed that the mobile device 20b is not associated a priori with a particular home agent.

Figure 4A:
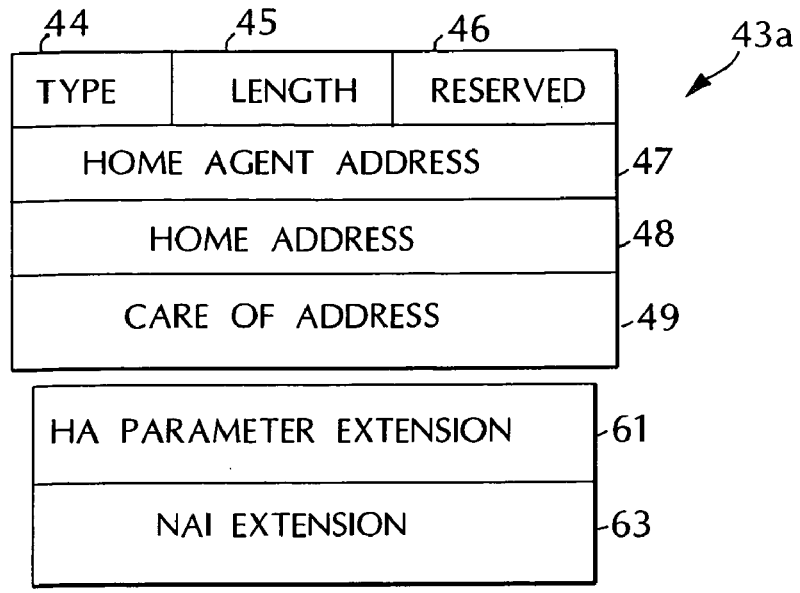
FIGS. 4A-4B illustrate formats of messages.

Referring to FIG. 3, the mobile device 20b sends 31 to the Mobile IP Proxy device 16 a registration request message 43a (FIG. 4A). The format of the registration request 43a in FIG. 4A includes a type field 44, a length field 45, a reserved field 46, a home agent address field 47, a home-address field 48, a care-of-address field 49, a HA parameter extension 61, and a network access identifier (NAI) extension 63.

The type field 44 indicates the type of message being sent. The length field 45 indicates the length of the request 43a. The reserved field 46 may be reserved for future use. The HA parameter extension field 61 specifies the actual home agent address. In the case when the registration request 43a is sent from the mobile device to the Mobile IP Proxy device 16, the actual home agent field in the HA parameter extension field 61 is set to zero to indicate to the Mobile IP Proxy that the mobile device has not been assigned a home agent. In that case, the Mobile IP Proxy assigns a home agent to the mobile device, creates a new registration request, and forwards it to the assigned home agent. This may allow the Mobile IP Proxy to select a home agent for the mobile device. In another scenario, the field 61 can include the actual home address of the mobile device.

The network access identifier (NAI) field 63 is used by the mobile device to dynamically request a home address from the home agent. The NAI field 63 adheres to a standard specified in RFC 2794 for Mobile IP Network Access Identifier Extension for IPv4 draft dated Mar. 30, 2002. Once the mobile IP proxy device 16 processes the registration request from the mobile device 20b, the mobile IP proxy device 16 then creates 36 a new registration request and sends the request to the home agent previously selected by the mobile proxy device. In this way, the selected home agent, also referred to as the actual home agent, is responsible for assigning 38 and determining a home-address.

Figure 4B:
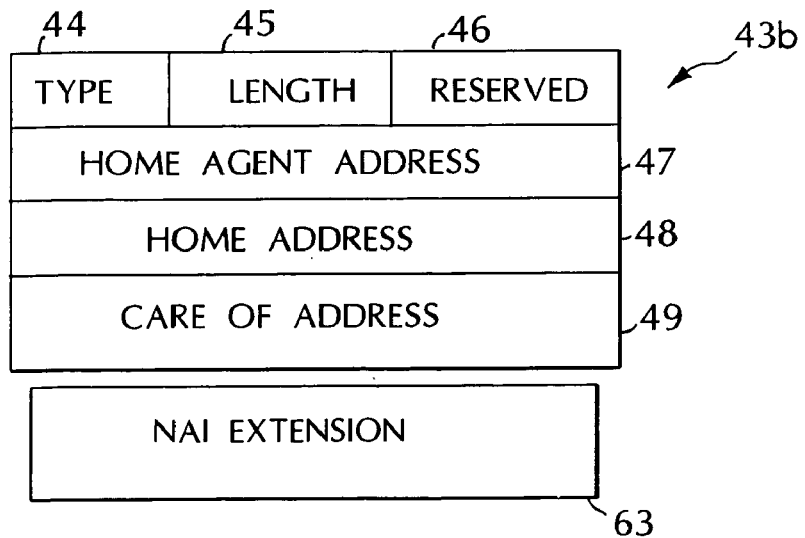

FIG. 4B shows a registration request 43b that is similar to the request 43a in FIG. 4A except that the request 43b does not include the HA parameter extension field 63. The Mobile IP Proxy sends the registration request 43b to the assigned home agent. The home agent address field 47 indicates the IP address of the home agent that is currently assigned to the mobile device 20b. The home-address field 48 is set to zero (unassigned)—this address will be assigned by the assigned home agent and notified to the Mobile IP proxy in the reply. The care-of-address field 49 identifies an IP address associated with a foreign network, but in this case it is set to the Mobile IP Proxy's internal address as it acts as surrogate mobile device to the assigned home agent.

The Mobile IP Proxy device 16 may perform the home agent assignment process using various techniques. For example, the Mobile IP Proxy device 16 may use route optimization criteria 108a1 to select a home agent from the home agent list 112 from the home-address list 114. Such a selection may involve choosing the most optimal home agent address based on the current location of the mobile device 20b. Suppose, for example, the location of subnet 21a of the home network 12 is New York City whereas the location of the subnet 21b is Los Angeles, Calif. In this case, the mobile proxy may select a local home agent based on the location of the mobile device 20b so as to minimize the use of expensive trunk lines between these two sites.

In a similar manner, the Mobile IP Proxy device 16 may use load balancing criteria 108a2 to select a lightly loaded home agent for the mobile device 20a. For example, a service discovery process such as service location protocol (SLP) can be employed to trigger automatic home agent and home-address discovery. Such techniques may enable the mobile proxy to identify and automatically associate a mobile device with a home agent.

Alternatively, the Mobile IP Proxy device 16 may select a home-address in a random manner according to the random criteria 108a3. Thus, by using different selection criteria, a home agent may be assigned to the mobile device in a dynamic manner. Although there are certain advantages to this dynamic process, the mobile proxy also may perform the assignment process in a static manner in which the home agent is predetermined.

Once the home agent receives the registration request, it assigns 38 a home-address to the Mobile device.

Figure 7A:
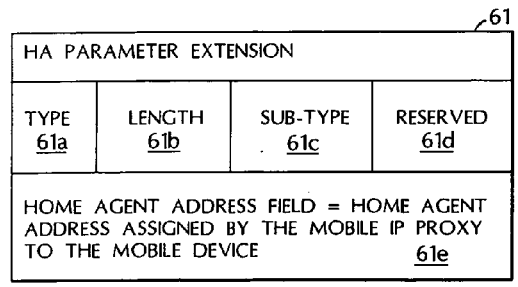
FIGS. 7A-7B illustrate formats of messages.
Figure 7B:
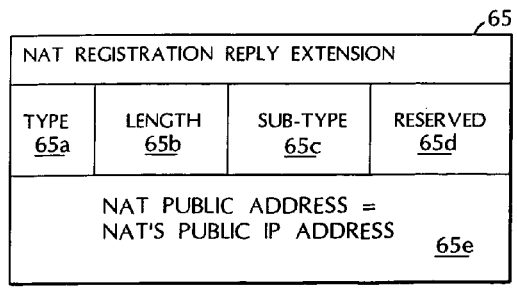

The home agent then sends 40 a reply to the requesting mobile IP proxy device 16. The Mobile IP Proxy device 16 may update its mobility binding list associated with the mobile device 20b. The Mobile IP Proxy creates a new registration reply that includes the HA parameter extension and the home-address assigned to the mobile device 20b. The home agent address field 61e in the HA parameter extension 61 (depicted in FIG. 7A) is set to the home agent address assigned by the Mobile IP proxy to the mobile device 20b. The extension 61 also includes a type field 61a, a length field 61b, a sub-type field 61c, and a reserved field 61d. The type field 61a and the sub-type field 61c is assigned by IANA, the length field 61b indicates the length (in bytes) of the data fields within the extension, excluding the type and length fields, and the reserved field 61d is reserved for future use.

The Mobile IP Proxy device 16 forwards 42 the new registration reply to the mobile device 20b that originally generated the registration request. As a result, the mobile device 20b maintains connectivity with the home network 12 and the Internet 18.

Thus, the mobile device 20b acquires a home agent and home-address, and it can communicate to its home network. Furthermore, it can maintain its connectivity and accessibility to its home network while it is roaming from one network subnet to another.

Figure 5:
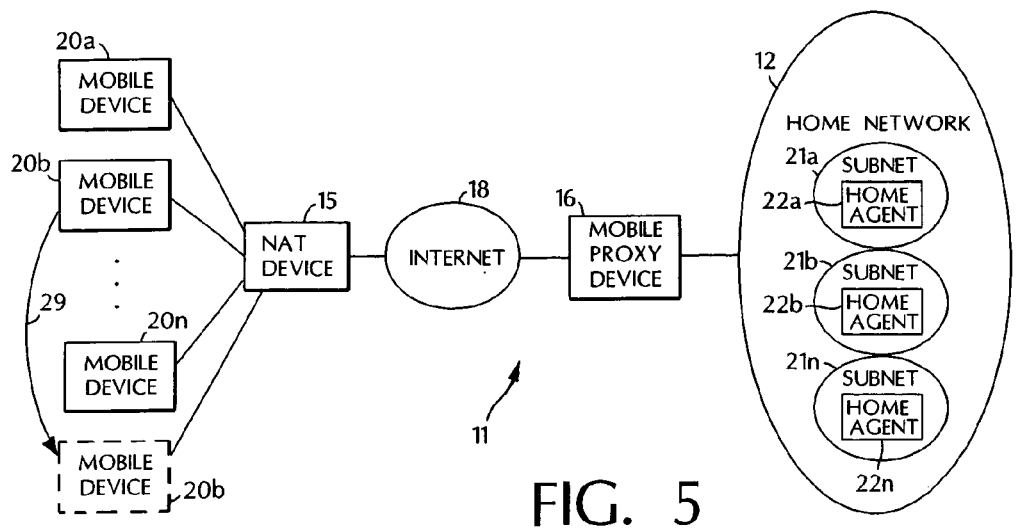
FIG. 5 illustrates a wireless communications network.

Referring to FIG. 5, a wireless communications network 11 is similar to the network 10 illustrated in FIG. 1, except that the network 11 also includes a foreign network behind network address translation (NAT) gateway device 15. The mobile IP proxy 16 manages a mobile device, such as 20b, as it roams from the home network 12 to the foreign network behind the NAT device 15. The operation of the mobile proxy 16 is described in detail below. The roaming process is represented by an arrow 29 and by the mobile device 20b with a "dashed" box outline in FIG. 5.

The NAT device 15 is a network device that may be deployed in the foreign network. In general, the NAT device 15 translates an IP address used in one network to a different IP address known within another network. One network is known as the inside network (contains non-routable addresses) and the other is the outside network (contains routable addresses). In this example, the outside network refers to the portion of the NAT device 15 that interfaces to the routable address space in the foreign network, whereas the inside network refers to the portion of the device that interfaces to the private network (non-routable address space). The NAT device 15 maps a non-routable network address to a routable IP address, as well as remaps the routable IP addresses back into their corresponding non-routable IP addresses. This translation process helps nodes in private address space (non-routable address space) communicate with nodes attached the public (routable address space) network.

The mobile proxy device 16 may be similar to the mobile proxy device 16 described above, except that the functionality of the device 16 may extend to handle Mobile IP traversal across NAT gateways. When the mobile device 20b roams from the home network 12 into the foreign network behind the NAT 15, the mobile device acquires a care-of-address. The care-of-address is a non-routable IP address associated with the foreign network behind the NAT 15.

Traditionally, the mobile device 20b attempts to register the care-of-address with its home agent in the home network 12 so that the home agent can forward data traffic to the mobile device behind a NAT in the foreign network 13. However, there are two incompatibility problems between Mobile IP and NAT that will break traffic flow from the home agent to the mobile device.

The first problem arises when a mobile device roams from its home network to a foreign network behind a NAT gateway, it acquires a non-routable care-of address, most likely through dynamic host configuration protocol (DHCP). The acquired non-routable care-of address is passed to the HA through a registration request. This causes the MN to lose its connectivity to its home network, since the HA will not be able to forward the MN's packets to the non-routable care-of address.

The second problem occurs even if the first problem is solved. An intervening NAT gateway in a foreign network will not always be able to demultiplex inbound IP-in-IP reverse tunneled MIPv4 data packets. Because, NAPT gateways will simply not be able to route the inbound IP-in-IP packets, as they rely on IP address and transport identifier to route the packets from routable to non-routable address space or vice a versa. And, in the case of Basic NAT, consider two mobile devices that are registered with the same Home Agent (HA). The inbound packets destined to the two mobile devices from the HA will have the same source and destination IP addresses—making it difficult for the NAT to route the packets inside.

Figure 6A:
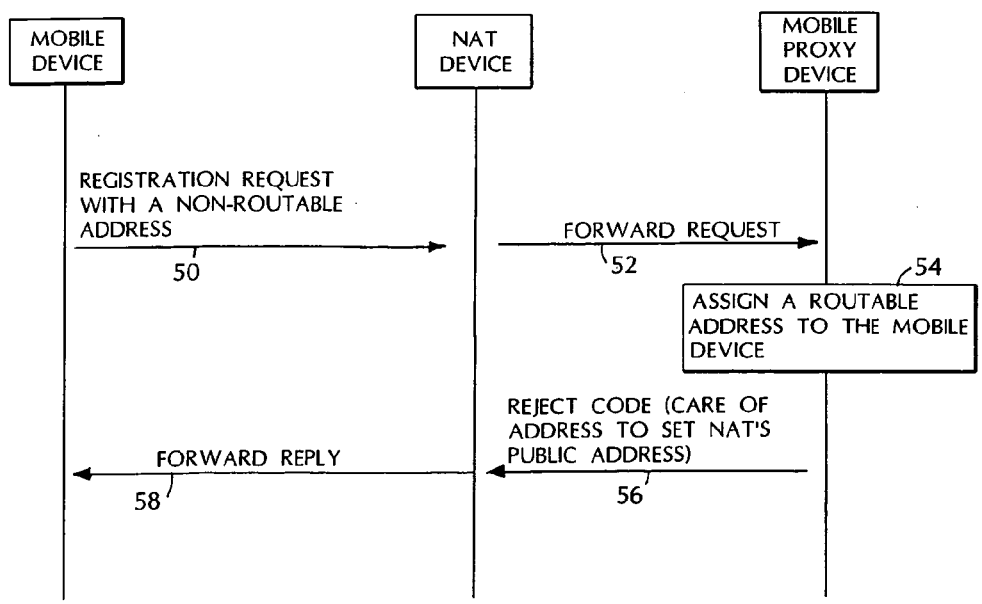
FIGS. 6A-6B are flow diagrams of processing requests from a mobile device.

FIG. 6A illustrates how the mobile proxy 16 manages the mobile device 20b as it roams from the home network 12, across a home network boundary 12a, to the foreign network 13, and behind the NAT device 15. In this example, it is assumed that the mobile device 20b was originally associated with a home agent in the home network 12 and that the mobile device detects a change in connectivity as it roams away from the home network 12 to the NAT device 15. Because the mobile device 20b is behind the NAT device 15, the mobile device acquires a care-of-address specifying a non-routable IP address rather than a routable address.

The mobile device sends 50 a registration request 43a to the mobile IP proxy device 16 through the NAT device 15. In a particular implementation when the mobile device can infer that it is behind NAT from the acquired care-of address, the mobile device 20b may set the value of the care-of-address field 49 of the registration request 43a to zero which is interpreted by the mobile proxy device 16 as indicating that the mobile device is requesting a routable address. Alternatively, the Mobile IP proxy can deduce that the mobile device is behind NAT from discrepancies between the care-of address and the source IP address of the received registration request.

After the NAT device 15 receives the registration request 43a, it forwards 52 the request to the mobile proxy device 16 by sending the request over a foreign network. In this example, the NAT device performs its normal address/port mapping and then forwards the request.

Upon receipt of the registration request 43a by the mobile proxy device 16, it realizes that the mobile device is behind a NAT and records the routable source IP address of the registration packet (i.e., NAT's routable address) for the mobile device's care-of address in its mobility binding list. The Mobile IP proxy also records the source user datagram protocol (UDP) port number of the received registration packet in its mobility binding list—used when it forwards the registration replies from the home agent to the mobile device. The mobile proxy device 16 sends 56 a reply with an appropriate registration reply extension and error code to the NAT device 15 which subsequently forwards the reply 58 to the mobile device 20b. The registration reply extension 65 (NAT registration reply extension depicted in 7B) has a NAT public address field 65e that contains the NAT's public IP address that should be used as a care-of address by the mobile device. The extension 65 also includes a type field 65a, a length field 65b, a sub-type field 65c, and a reserved field 65d. The type field 65a and the sub-type field 65c is assigned by IANA, the length field 65b indicates the length (in bytes) of the data fields within the extension, excluding the type and length fields, and the reserved field 65d is reserved for future use. The mobile device 20b may also use a secure NAT gateway discovery protocol to acquire the routable address of the NAT device 15. Such a protocol may help reduce the possibility of denial-of-services (DOS) attacks because it can verify or confirm the public address associated with the NAT device 15.

Figure 6B:
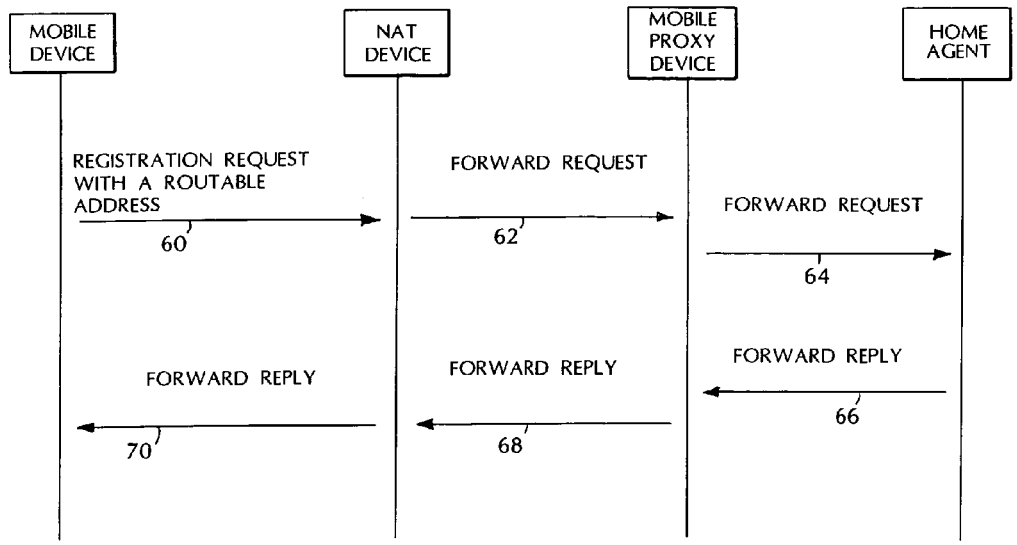

FIG. 6B illustrates subsequent operation of the mobile proxy device 16 after the mobile device 20b receives a reply from the mobile proxy device in response to the registration request. After the mobile device 20b receives the routable address from the mobile proxy device 16, the mobile device sends 60 a subsequent registration request 43a that the request includes the routable address. Before the mobile device 20b sends the request, it may verify whether the care-of-address is a valid IP address using traceroute messages. Such traceroute messages may be part of a network debugging tool utility specified by RFC 1393 dated January 1993.

After the request has been sent by the mobile device 20b to the NAT device 15, the NAT device forwards 62 the request to the mobile IP proxy device 16. The mobile IP proxy device 16 then forwards 64 the request to the home agent associated with the mobile device. In this example, the home agent belongs to the home network 12. The home agent creates a mobility binding entry in its binding tables to keep track of the registration request. Likewise, the mobile IP proxy device 16 keeps track of the registration transaction by creating an entry for the transaction in its mobility binding list 110 (see FIG. 2). The home agent then sends 66 to the mobile proxy device 16 a reply indicating whether the registration request was successful. The mobile proxy device 16 forwards 68 the reply to the NAT device (using NAT's public/routable address) 15, which subsequently forwards 70 the replay to the mobile device 20b.

The mobile proxy device 16 can enable the mobile device 20 to roam seamlessly from the home network 12 behind a NAT device 15 in the foreign network 13. As described above, a routable address based on the source IP address of the NAT device is used a care-of address for the mobile device. Once the mobile device 20b is registered, subsequent data traffic can take place between the mobile device and over the foreign network and the Internet 18. Such data traffic may be based on a communication method known as data encapsulation using a UDP tunnel. A UDP tunnel enables the NAPT device 15 to de-multiplex return inbound mobile IP data traffic using traditional NAPT mechanisms. UDP is a communications protocol that offers a limited amount of service when messages are exchanged between computers in a network that uses IP such as between the mobile device 20b and the mobile proxy 16.

The UDP protocol may be an alternative to transmission control protocol (TCP) and, together with IP, is sometimes referred to UDP/IP. Like TCP, UDP uses IP to move a data unit (known as a datagram) from one computer to another. Unlike TCP, however, UDP does not provide the service of dividing a message into packets and reassembling it at the other end. UDP uses the concept of port numbers to distinguish different mobile device requests. A port number is a 16-bit identifier that is appended to a header portion of a message unit. Some services or processes have conventionally been assigned permanent port numbers known as "well known port numbers". In other cases, the port number is assigned temporarily from a range of assigned port numbers. The mobile proxy 16 may support the flexible selection of UDP ports including the reuse of an existing Mobile IP "well known port number" or the specification of a new UDP port, negotiated in real-time between the mobile devices and the mobile proxy 16. Moreover, the mobile proxy device 16 may allow the mobile device 20b to refresh NAT device port mappings for inbound traffic by accepting "keep-alive" messages for a UDP port used to tunnel mobile IP data between the mobile device 20b and the home network.

The foregoing techniques may enable mobile devices to maintain substantially uninterrupted communications while moving to another location associated with a new subnet, including those that only support non-routable IP addresses. The mobile proxy device can dynamically assign a home agent to a mobile device using techniques such as load balancing and route optimization. Mobile devices with dynamic home-address configuration can be deployed in a scalable manner by reducing the need for pre-configuring mobile devices with a permanent home-address. In addition, the mobile proxy device includes registration mechanisms that may allow a mobile device to maintain connectivity with a home network when the mobile device roams behind a NAT gateway device.

The mobile proxy device provides a Mobile IP NAT traversal solution requires no changes to intervening NAT devices. In addition, these solutions can use a previously reserved Mobile IP UDP port number or a different port. Such a solution may be important for traversing an Enterprise firewall.

The solution also may provide a "keep alive" technique to refresh NAT device port mappings that imposes little overhead on existing protocols.

In addition, the foregoing techniques may require little or no change to intervening NAT devices, a home agent.

Various features of the invention may be implemented in hardware, software, or a combination of hardware and software. For example, some aspects of the system can be implemented in hardware such as an application-specific integrated circuit (ASIC), field-programmable gate array (FPGA), or other hardware. Some aspects of the system may be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer or processor, for configuring and operating the computer when the storage medium is read by the computer to perform the functions described above.

Other implementations are within the scope of the following claims.

What is claimed is:

1. A method comprising:
   receiving at a mobile proxy device, a request from a mobile device that has moved to a foreign network, to register with a home agent;
   in response to the request, dynamically assigning one of a plurality of home agents to the mobile device;
   setting the mobile proxy device's address as a care-of-address associated with the request; and
   sending from the mobile proxy device to the mobile device a reply including a home-address associated with the assigned one of the plurality of home agents.

2. The method of claim 1, comprising assigning the home agent based on route optimization criteria.

3. The method of claim 1, comprising assigning the home agent based on load balancing criteria.

4. The method of claim 1 further comprising:
   forwarding the request to the assigned home agent;
   receiving from the assigned home agent a reply including a home-address associated with the assigned home agent; and
   forwarding the reply received from the home agent to the mobile device.

5. The method according to claim 1 wherein the mobile proxy device is in a home network.

6. An apparatus comprising:
   a network interface adapter; and
   a processor coupled to the network interface adapter, wherein the processor is adapted to:
      receive a request from a mobile device to register with a home agent, when the mobile device moves into a foreign network,
      in response to the request, dynamically assign one of a plurality of home agents in a home network that are coupled via the network interface adapter to a mobile proxy device to the mobile device,
      set the network interface adapter's internal address as a care-of-address associated with the request, and
      send through the network interface adapter a reply to the mobile device, the reply including a home-address associated with the assigned home agent.

7. The apparatus of claim 6 wherein the processor is adapted to assign one of the plurality of home agents based on route optimization criteria.

8. The apparatus of claim 6 wherein the processor is adapted to assign one of the plurality of home agents based on load balancing criteria.

9. The apparatus of claim 6 wherein the processor and network interface adapter are located in the home network.

10. An article comprising a computer-readable medium that stores computer-executable instructions for causing a computer to:
    receive a request from a mobile device to register with a home agent;
    in response to the request, dynamically assign one of a plurality of home agents in a home network that are coupled to the computer to the mobile device in response to receiving from the mobile device the request;
    set a mobile proxy device's address as a care-of-address associated with the request; and
    send to the mobile device a reply including a home-address associated with the assigned home agent.

11. The article of claim 10 further comprising instructions for causing the computer to assign one of the plurality of home agents based on route optimization criteria.

12. The article of claim 10 further comprising instructions for causing the computer to assign one of the plurality of home agents based on load balancing criteria.

13. The article of claim 10 wherein the mobile proxy device is located in the home network.

14. A system comprising:
    a plurality of home agent in a home network;
    a mobile device; and
    a mobile proxy device,
    wherein the mobile device is adapted to send a request to the mobile proxy device to register with a home agent when the mobile device has moved to a foreign network; and
    wherein the mobile proxy device is adapted to:
       receive the request from the mobile device;
       in response to the request, dynamically assign one of the plurality of home agents to the mobile device;
       set the mobile proxy device's address as a care-of-address associated with the request; and
       send to the mobile device a reply including a home-address associated with the assigned one of the plurality of home agents in the home network.

15. The system of claim 14 wherein the mobile proxy device is further adapted to assign a home agent based on route optimization criteria.

16. The system of claim 14 wherein the mobile proxy device is further adapted to assign a home agent based on load balancing criteria.

17. The system of claim 14 wherein the mobile proxy device is located in the home network.

18. A method comprising:
    receiving, at a mobile proxy device, from a mobile device that has moved into a foreign network, a request for a routable home-address via a network address translation (NAT) gateway;

in response to the request, assigning a routable home-address associated with the NAT gateway as a care-of-address for the mobile device;

sending to the mobile device a reply including the routable home-address associated with the NAT gateway for use as a care-of-address for the mobile device;

receiving from the mobile device a request for a home agent;

setting the mobile proxy device's address as a care-of-address associated with the request;

dynamically assigning one of a plurality of home agents to the mobile device; and sending to the mobile device a reply having a home-address associated with the assigned home agent.

19. The method of claim 18 comprising assigning the routable home-address based on a source address of the request.

20. The method of claim 18 further comprising:
receiving from the mobile device a subsequent request including the assigned routable home-address;
forwarding the subsequent request to a home agent associated with the mobile device;
receiving from the home agent a reply indicating that the routable home-address has been registered; and
forwarding the reply from the home agent to the mobile device.

21. The method of claim 18 wherein the mobile proxy device receives requests in a home network.

22. An apparatus comprising:
a network interface adapter; and
a processor coupled to the network adapter, wherein the processor is adapted to:
  receive a request for a routable home-address from a mobile device via a network address translation (NAT) gateway, when the mobile device moves into a foreign network,
  in response to the request, assign a routable home-address associated with the NAT gateway as a care-of-address for the mobile device,
  set the network interface adapter's internal address as a care-of-address associated with the request, and
  send through the network interface adapter a reply to the mobile device, the reply including the assigned one of plurality of routable home-addresses associated with the NAT gateway for use as a care-of-address for the mobile device;
wherein the processor and network interface adapter are located in a home network.

23. The apparatus of claim 22, wherein the processor is adapted to assign the routable home-address based on a source address of the request.

24. The apparatus of claim 22, wherein the processor is adapted to:
receive from the mobile device a subsequent request having the routable home-address associated with the NAT gateway as the care-of-address for the mobile device;
forward the subsequent request to a home agent in a home network associated with the mobile device;
in response to the forwarded request, receive a reply from the home agent indicating that the routable home-address has been registered; and
forward the reply to the mobile device.

25. An article comprising a computer-readable medium that stores computer-executable instructions for causing a computer to:

receive, at a mobile proxy device, a request for a routable address from a mobile device via a network address translation (NAT) gateway, when the mobile device moves into a foreign network;

in response to the request, assign a routable home-address associated with the NAT gateway as a care-of-address for the mobile device in response to receiving the request;

set the mobile proxy device's address as a care-of-address associated with the request;

send to the mobile device a reply including the routable home-address associated with the NAT gateway for use as the care-of address for the mobile device, and dynamically assigning one of plurality of home agents to the mobile device.

26. The article of claim 25 further comprising instructions for causing the computer to assign the routable home-address based on a source address of the request.

27. The article of claim 25 further comprising instructions for causing the computer to
in response to receipt from the mobile device of a subsequent request having the routable home-address, forward the subsequent request to the home agent associated with the mobile device;
in response to the forwarded subsequent request, receive a reply from the home agent indicating that the routable home-address has been registered; and
forward the reply to the mobile device.

28. The article of claim 25 wherein the mobile proxy device is located in a home network.

29. A system comprising:
a mobile device; and
a mobile proxy including a processor and instructions executable by the processor to cause the processor to:
  receive a request for a routable address, via a network address translation (NAT) gateway from the mobile device, when the mobile device moves into a foreign network,
  in response to the request, assign a routable home-address associated with the NAT gateway for use as a care-of-address by the mobile device,
  set the mobile proxy's address as a care-of-address associated with the request;
  send to the mobile device a reply including the routable home-address, and
  dynamically assigning one of plurality of home agents to the mobile device.

30. The system of claim 29, wherein the mobile proxy further comprises instructions to cause the processor to assign a routable home-address based on a source address of the request.

31. The system of claim 29, wherein the mobile proxy further comprises instructions to cause the processor to:
in response to receipt from the mobile device a subsequent request having the routable home-address, forward the request to the home agent associated with the mobile device;
in response to the forwarded request, receive a reply from the home agent indicating that the routable home-address has been registered; and
forward the reply to the mobile device.

32. The system of claim 29 wherein the mobile proxy device is located in a home network.

* * * * *